(12) United States Patent  
Gindele

(10) Patent No.: US 6,937,772 B2  
(45) Date of Patent: Aug. 30, 2005

(54) MULTIRESOLUTION BASED METHOD FOR REMOVING NOISE FROM DIGITAL IMAGES

(75) Inventor: Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 387 days.

(21) Appl. No.: 09/742,957

(22) Filed: Dec. 20, 2000

(65) Prior Publication Data

US 2002/0118887 A1 Aug. 29, 2002

(51) Int. Cl.$^7$ ................................................ G06K 9/36
(52) U.S. Cl. .................. 382/240; 382/260; 375/240.29
(58) Field of Search ............................... 382/232, 250, 382/260–275

(56) References Cited

U.S. PATENT DOCUMENTS

| 5,461,655 | A | * | 10/1995 | Vuylsteke et al. | ............. 378/62 |
| 5,526,446 | A |   | 6/1996  | Adelson et al.   |                     |
| 5,644,662 | A | * | 7/1997  | Vuylsteke        | .................... 382/362 |
| 5,729,631 | A |   | 3/1998  | Wober et al.     |                     |
| 5,825,936 | A | * | 10/1998 | Clarke et al.    | ................ 382/261 |
| 5,907,642 | A | * | 5/1999  | Ito              | .............................. 382/274 |
| 6,151,420 | A | * | 11/2000 | Wober et al.     | ................ 382/275 |

OTHER PUBLICATIONS

Ranganath, "Image Filtering Using Multiresolotion represetation" IEEE transaction on Pattern and Machine Intellecigence, vol. 13, No. 5 May 1991.*

"Gradient Inverse Weighted Smoothing Scheme and the Evaluation of its Performance", by David C. C. Wang et al., Computer Graphics and Image Processing 15 (1981), pp. 167–181.

"The Laplacian Pyramid as a Compact Image Code", by Peter J. Burt et al., IEEE Transactions on Communications, vol. Com–31, No. 4, Apr. 1983, pp. 532–540.

"Digital Image Smoothing and the Sigma Filter", by Jong–Sen Lee, Computer Vision, Graphics and Image Processing 24 (1983) pp. 255–269.

"Numerical Recipes the Art of Scientific Computing" by William H. Press et al., produced by the Cambridge University Press, pp. 98–101.

* cited by examiner

Primary Examiner—Jingge Wu  
(74) Attorney, Agent, or Firm—Raymond L. Owens

(57) ABSTRACT

A method of removing noise from a digital image including receiving an original digital image including a plurality of pixels; generating at least one residual digital image and at least one base digital image from the original digital image, the base digital image having a lower spatial resolution than the original digital image; and generating a noise reduced base digital image by removing noise from the base digital image with a noise reduction filter so that when the noise reduced base digital image is combined with the residual digital image to produce a reconstructed digital image, noise is not present in the reconstructed digital image.

32 Claims, 13 Drawing Sheets

MULTIRESOLUTION BASED METHOD FOR REMOVING NOISE FROM DIGITAL IMAGES

CROSS REFERENCE TO RELATED APPLICATIONS

Reference is made to commonly assigned U.S. patent application Ser. No. 09/143,398 filed Oct. 6, 1999, entitled "Noise Reduction Method, Apparatus, and Program for Digital Image Processing" by Edward B. Gindele; and U.S. patent application Ser. No. 09/688,894 filed Oct. 16, 2000, entitled "Removing Color Aliasing Artifacts from Color Digital Images" by James E. Adams, Jr.; the disclosures of which are incorporated herein by reference.

FIELD OF INVENTION

The present invention relates to providing filtered digital images with reduced noise.

BACKGROUND OF THE INVENTION

There are many approaches to removing noise from digital images, however, most methods make use of spatial filtering techniques. One class of noise reduction spatial filters employs a non-linear localized spatial filtering technique directly to a digital image. An example of such a noise reduction filter is the Sigma Filter, described by Jong Sen Lee in the journal article *Digital Image Smoothing and the Sigma Filter*, Computer Vision, Graphics, and Image Processing Vol. 24, p. 255–269, 1983. This noise reduction filter uses a non-linear pixel averaging technique sampled from a rectangular window about the center pixel. Pixels in a local neighborhood about the center pixel are either included or excluded from the numerical averaging process on the basis of the difference between the local pixel and the center pixel. The small local neighborhood of pixels used by the Sigma filter make it simple to implement and effective at removing the high spatial frequency components of noise.

Gaussian noise sources exhibit random noise fluctuations over a large range of spatial frequencies. Although the Sigma filter was designed to work with Gaussian noise sources, the Sigma filter generally only removes the highest spatial frequency components of noise and thus has difficulty removing the low spatial frequency components of noise. This is largely due to the fact that the Sigma Filter operates on a small local neighborhood of pixels. Therefore, lower spatial frequency components of noise are not removed. The resultant processed digital images with the Sigma filter can have a mottled appearance particularly for sky regions of images that have little image structure.

Multiresolution, or pyramid, methods as a means of representing images as a function of spatial resolution for image processing as a long history. Burt and Adelson, described a method of representing a digital image by a series of residual images and a base digital image in their journal article "The Laplacian Pyramid as a Compact Image Code" IEEE Transactions on Communications, Vol. Com-31, No. 4, April 1983. Although the method taught by Burt and Adelson was designed with image compression methods in mind, the spatial frequency representation has application for noise reduction filtering methods.

Multiresolution, or pyramid-based, noise reduction filters have been used to remove noise from digital images. These methods are designed to remove noise of low and high spatial frequencies. In U.S. Pat. No. 5,729,631 Wober et al. disclose a pyramid spatial frequency decomposition method of removing noise from a digital image using a pyramid of generated with the Discrete Cosine Transform (DCT). This method involves calculating a resolution series of DCT coefficients and a DC image from the original digital image, filtering the DCT coefficients with a Wiener noise filter, and reconstructing the noise reduced digital image. The method taught by Wober et al. removes noise from the digital image for different spatial frequencies by operating on the residual images (DCT coefficients). As such the method taught by Wober et al. cannot be employed without the pyramid construct.

The wavelet spatial frequency decomposition method has also been employed for the use of removing noise from digital images. In U.S. Pat. No. 5,526,446, Adelson and Freeman disclose a technique which converts an image into a set of coefficients in a multi-scale image decomposition process followed by the modification of each coefficient based on its value and the value of coefficients of related orientation, position, or scale. While the method disclosed by Adelson and Freeman is capable of removing noise of low and high spatial frequency, their method must be applied to the set of multi-scale coefficients and cannot be directly applied to a digital image.

Noise in digital images is generally exhibited throughout a range of spatial frequencies. The Sigma filter can be used to remove only the highest spatial frequency components of noise. The methods disclosed by Wober et al. and Adelson et al. can be used to remove the low and high spatial frequency components of noise. However, the class of simple spatial noise filters, such as the Sigma filter, can be applied directly to a digital image while the spatial frequency pyramid-based methods must employ noise filters designed to work with residual images.

SUMMARY OF THE INVENTION

It is an object of the present invention to provide a noise reduction filter that combines the low spatial frequency noise cleaning properties of pyramid-based noise filters with the high spatial frequency noise cleaning properties of small local noise reduction filters.

It is a further object of the present invention to provide a pyramid-based noise reduction filter that first decomposes an original digital image into a pyramid representation and then removes noise from the original digital image as part of the pyramid reconstruction process.

It is a still further object of the present invention to provide a pyramid-based noise reduction filter that removes noise from an original digital image as part of the pyramid decomposition process and then reconstructs a noise reduced digital image.

These objects are achieved in a method of removing noise from a digital image, comprising the steps of:

a) receiving an original digital image including a plurality of pixels;

b) generating at least one residual digital image and at least one base digital image from the original digital image, the base digital image having a lower spatial resolution than the original digital image; and c) generating a noise reduced base digital image by removing noise from the base digital image with a noise reduction filter so that when the noise reduced base digital image is combined with the residual digital image to produce a reconstructed digital image, noise is not present in the reconstructed digital image.

The present invention has recognized that, quite unexpectedly, by providing filtering one or more base images of a multiresolution digital image representation, a very highly effective method of noise reduction is provided when the noise reduced base and corresponding residual images are used to reconstruct the original image.

Quite unexpectedly, it has been found that effective noise removal can be accomplished with any multiresolution or pyramid-based digital image representation such as, for example only, Laplacian pyramid methods, wavelet transforms, and DCT.

The present invention can make use of a number of filtering techniques such as using Sigma filters and medium filters.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
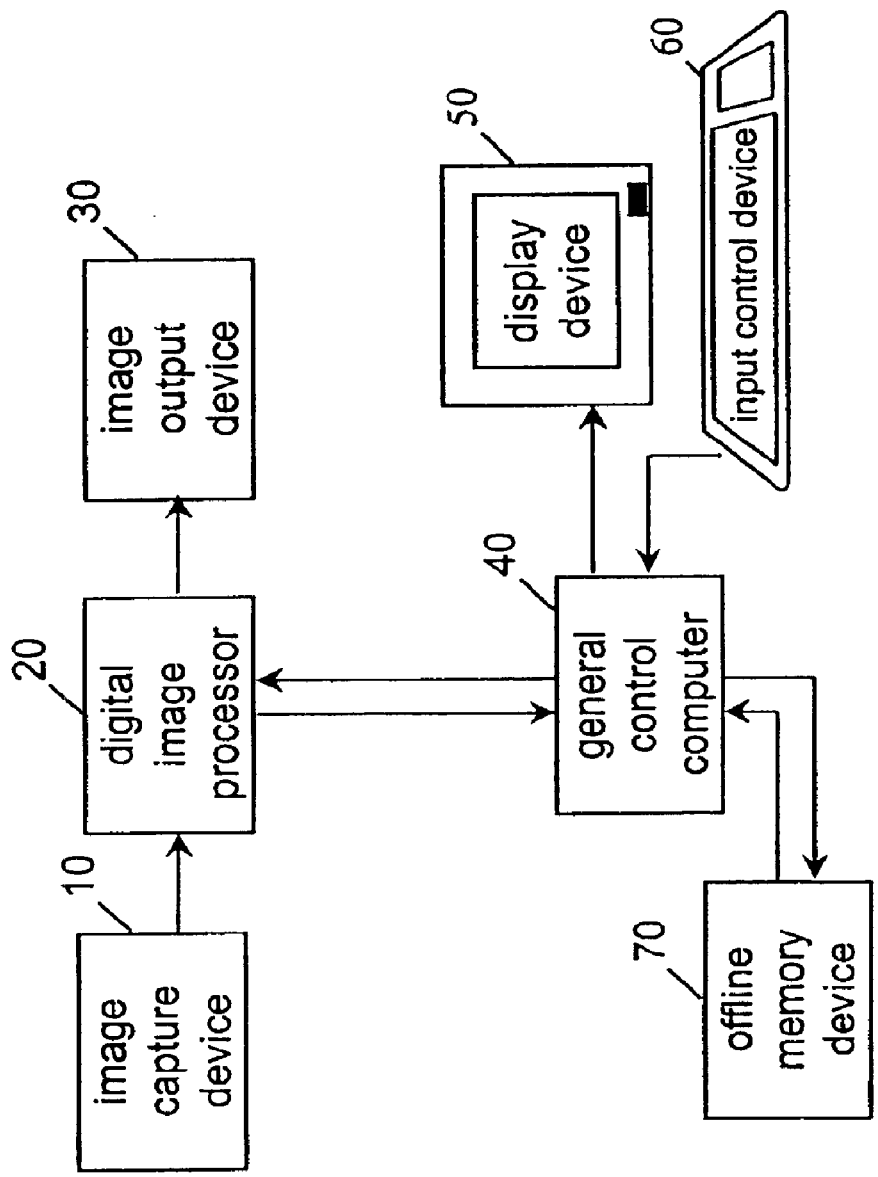
FIG. 1 is a functional block diagram of a computer system suitable for practicing the present invention.

The present invention may be implemented in computer hardware. Referring to FIG. 1, the following description relates to a digital imaging system which includes an image capture device 10, an digital image processor 20, an image output device 30, and a general control computer 40. The system may include a display device 50 such as a computer console or paper printer. The system may also include an input control device 60 for an operator such as a keyboard and or mouse pointer. The present invention can be used multiple capture devices 10 that produce digital images. For example, FIG. 1 may represent a digital photofinishing system where the image capture device 10 is a conventional photographic film camera for capturing a scene on color negative or reversal film, and a film scanner device for scanning the developed image on the film and producing a digital image. The digital image processor 20 provides the means for processing the digital images to produce pleasing looking images on the intended output device or media. The present invention can be used with a variety of output devices 30 which may include, but is not limited to, a digital photographic printer and soft copy display. The digital image processor 20 can be used to process digital images to make adjustments for overall brightness, tone scale, image structure, etc. of digital images in a manner such that a pleasing looking image is produced by an image output device 30. Those skilled in the art will recognize that the present invention is not limited to just these mentioned image processing functions.

The general control computer 40 shown in FIG. 1 may store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention implemented in a combination of software and/or hardware is not limited to devices which are physically connected and/or located within the same physical location. One or more of the devices illustrated in FIG. 1 may be located remotely and may be connected via a wireless connection.

A digital image is comprised of one or more digital image channels. Each digital image channel is comprised of a two-dimensional array of pixels. Each pixel value relates to the amount of light received by the imaging capture device corresponding to the physical region of pixel. For color imaging applications, a digital image will often consist of red, green, and blue digital image channels. For monochrome applications, the digital image will only contain one digital image channel. Motion imaging applications can be thought of as a sequence of digital images. Those skilled in the art will recognize that the present invention can be applied to, but is not limited to, a digital image channel for any of the above mentioned applications. In fact, the present invention can be applied to any two dimensional array of noise corrupted data to obtain a noise cleaned output. Although the present invention describes a digital image channel as a two dimensional array of pixels values arranged by rows and columns, those skilled in the art will recognize that the present invention can be applied to mosaic (non rectilinear) arrays with equal effect. Those skilled in the art will also recognize that although the present invention describes replacing original pixel values with processed pixel values, it is also trivial to form a new digital image with the processed pixel values and retain the original pixel values in tact.

Figure 2:
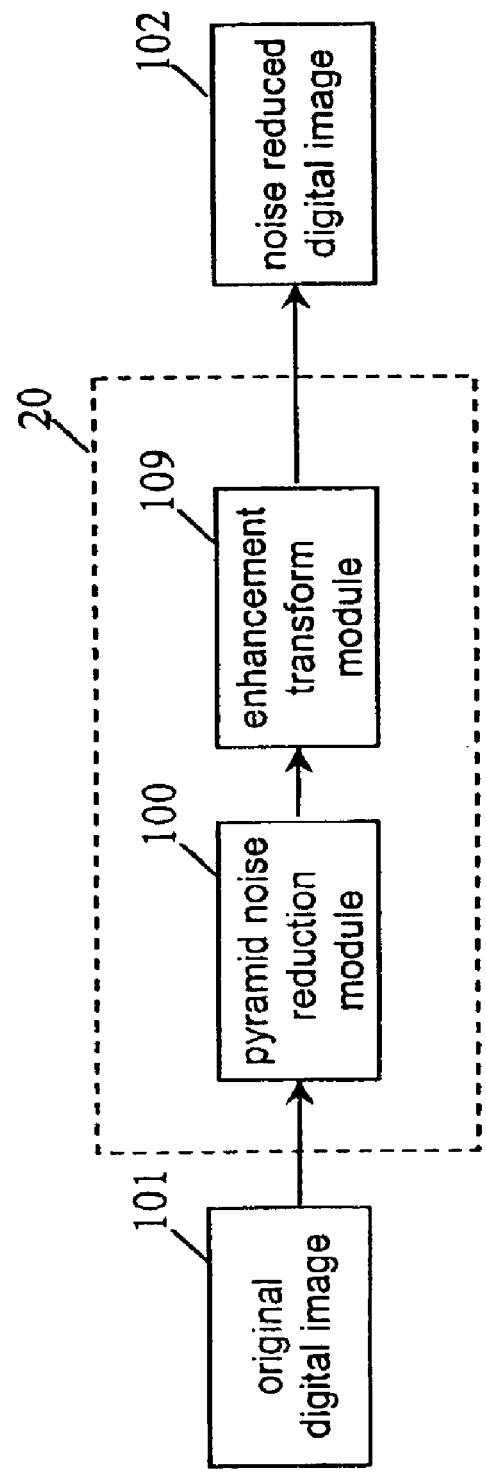
FIG. 2 is a functional block diagram of the digital image processor of FIG. 1.

The digital image processor 20 shown in FIG. 1 is illustrated in more detail in FIG. 2. The original digital image 101 is received and processed by the pyramid noise reduction module 100 which produces a noise reduced digital image. The enhancement transform module 109 receives and modifies the noise reduced digital image 102. The present invention can be practiced with enhancement transform modules 109 which modify a digital image such as but not limited to digital image processing modules for balancing, tone scaling, and spatial sharpening. The present invention removes noise from a digital image and as such is best placed before a spatial sharpening image processing module. Although it is not shown in FIG. 2, the present invention can be practiced with other digital image processing modules processing the digital image before the application of the pyramid noise reduction module 100.

Figure 3:
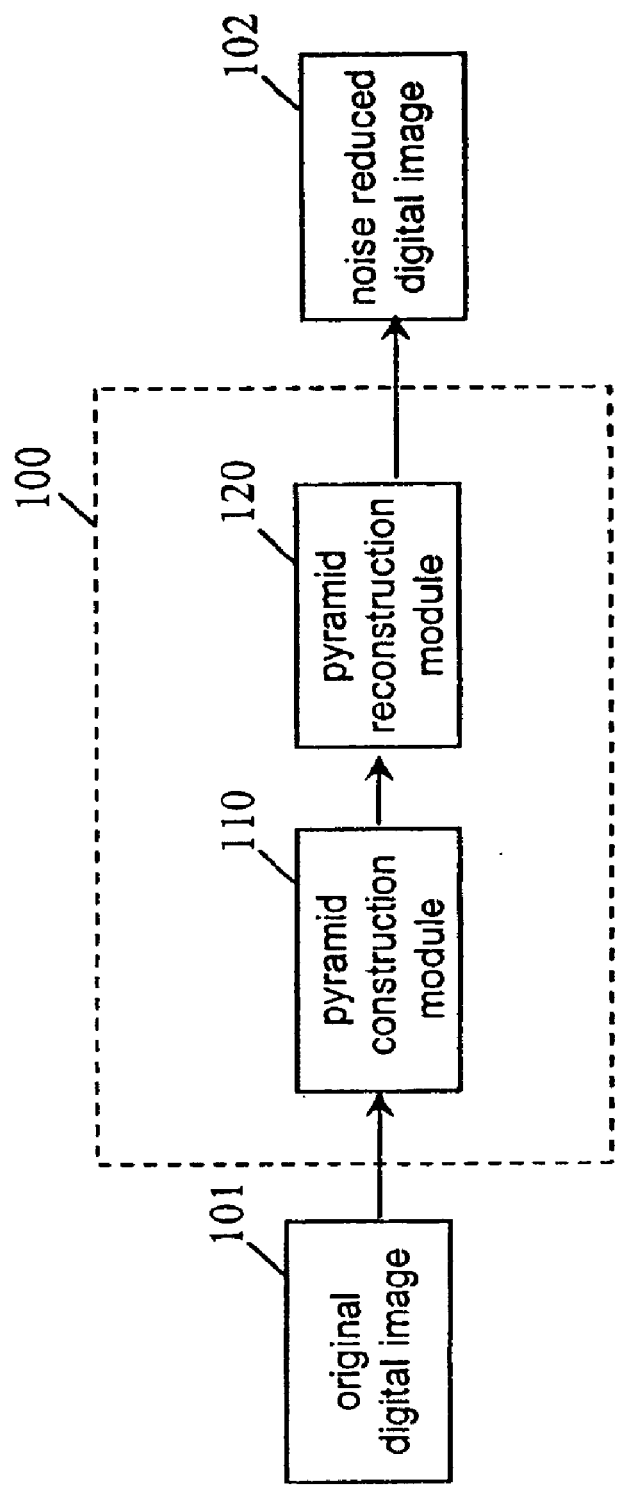
FIG. 3 is a functional block diagram of a pyramid noise reduction module that can be used in the present invention.

The pyramid noise reduction module 100 shown in FIG. 2 is illustrated in more detail in FIG. 3. The pyramid construction module 110 receives the original digital image 101 and generates an image pyramid representation of the original digital image 101, i.e. a hierarchical multiresolution representation including at least one base digital image and at least one residual digital image. The image pyramid representation of the original digital image 101 is received by the pyramid reconstruction module 120 which removes noise from the base digital images of the image pyramid representation pixel data as the image reconstruction process proceeds. The output of the pyramid reconstruction module 120 is a reconstructed digital image called the noise reduced digital image 102. The reconstructed digital image produced by the pyramid reconstruction module 120 has the same, or nearly the same, spatial resolution as the original digital image 101 but does not contain the noise present in the original digital image 101.

Figure 4:
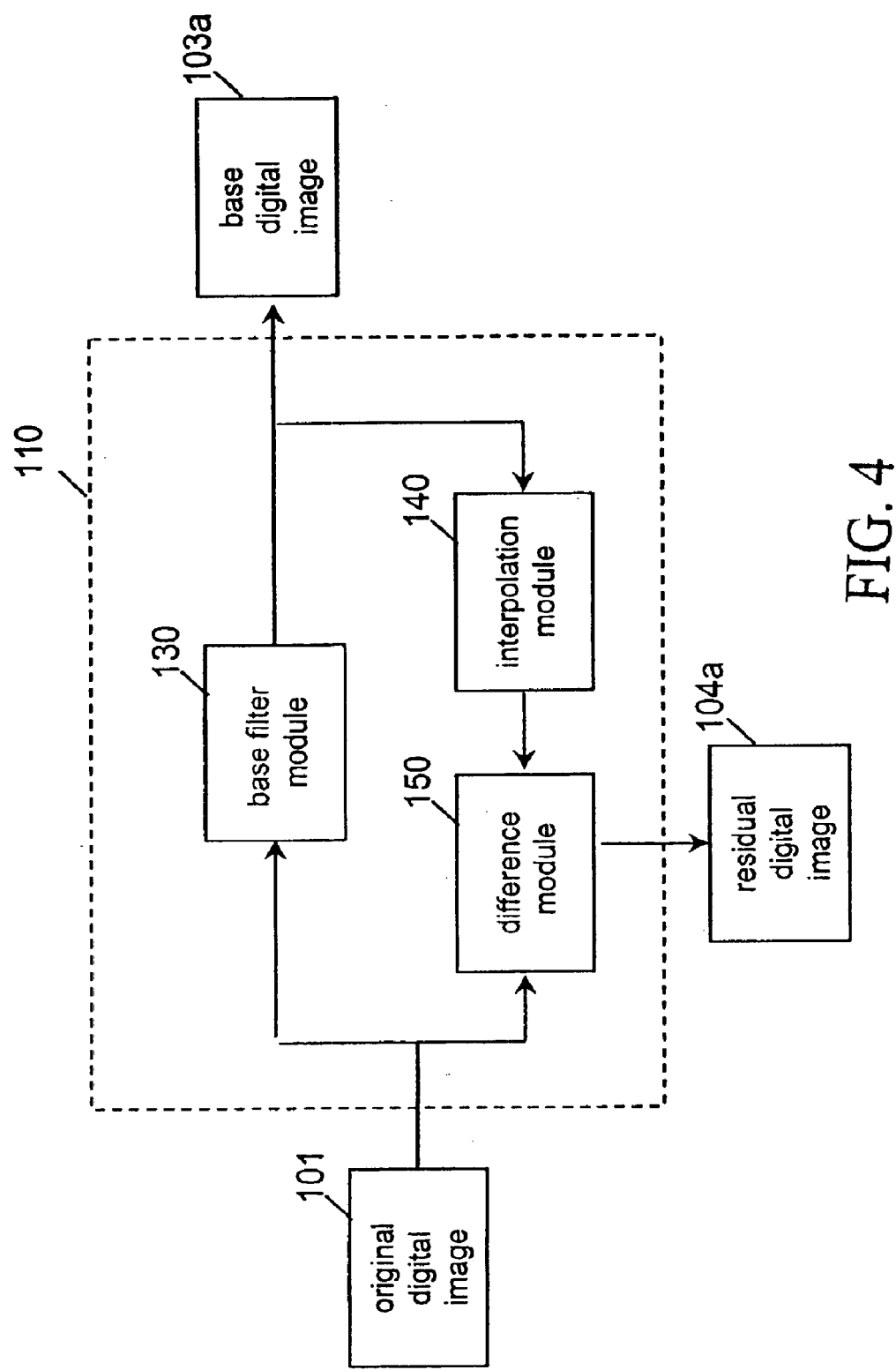
FIG. 4 is a functional block diagram showing in more detail the pyramid construction module of FIG. 3.

The pyramid construction module 110 shown in FIG. 3 is illustrated in more detail in FIG. 4. The original digital image 101 is received by the base filter module 130 which applies a spatial filter to original digital image 101 which both smoothes and samples the pixel data. The resultant base digital image 103*a* is a lower spatial resolution version of the original digital image 101. The base digital image 103*a* is received by the interpolation module 140 that produces an interpolated digital image which is a higher spatial resolution version of the base digital image 103*a*, i.e. essentially the same spatial resolution as the original digital image 101. The difference module 150 receives the interpolated digital image and the original digital image 101 and produces a residual digital image 104*a*.

The base digital image 103*a* and the original digital image 101 have pixel values of roughly the same numerical range. Both the base digital image 103*a* and the original digital image 101 are digital images that when displayed on a display device 50 look about the same with the exception of that the base digital image 103*a* is smaller. Since the interpolated digital image is derived from the base digital image 103*a* with an interpolation filter, the interpolated digital image contains less spatial detail than the original digital image 101. The residual digital image 104*a* contains the missing spatial detail. Therefore, the residual digital image 104*a* has a very different character from the base digital image 103*a*. The residual digital image 104*a* contains pixel data which when displayed on a display device 50 does not look like a natural image. Instead the residual digital image 104*a* has a noisy appearance and contains some structural details of the original digital image 101. Although there are different methods to encode the pixel data of the residual digital image 104*a*, the pixel data is inherently zero mean data (i.e., the average pixel value is approximately zero) with positive and negative fluctuations about the mean.

Figure 5:
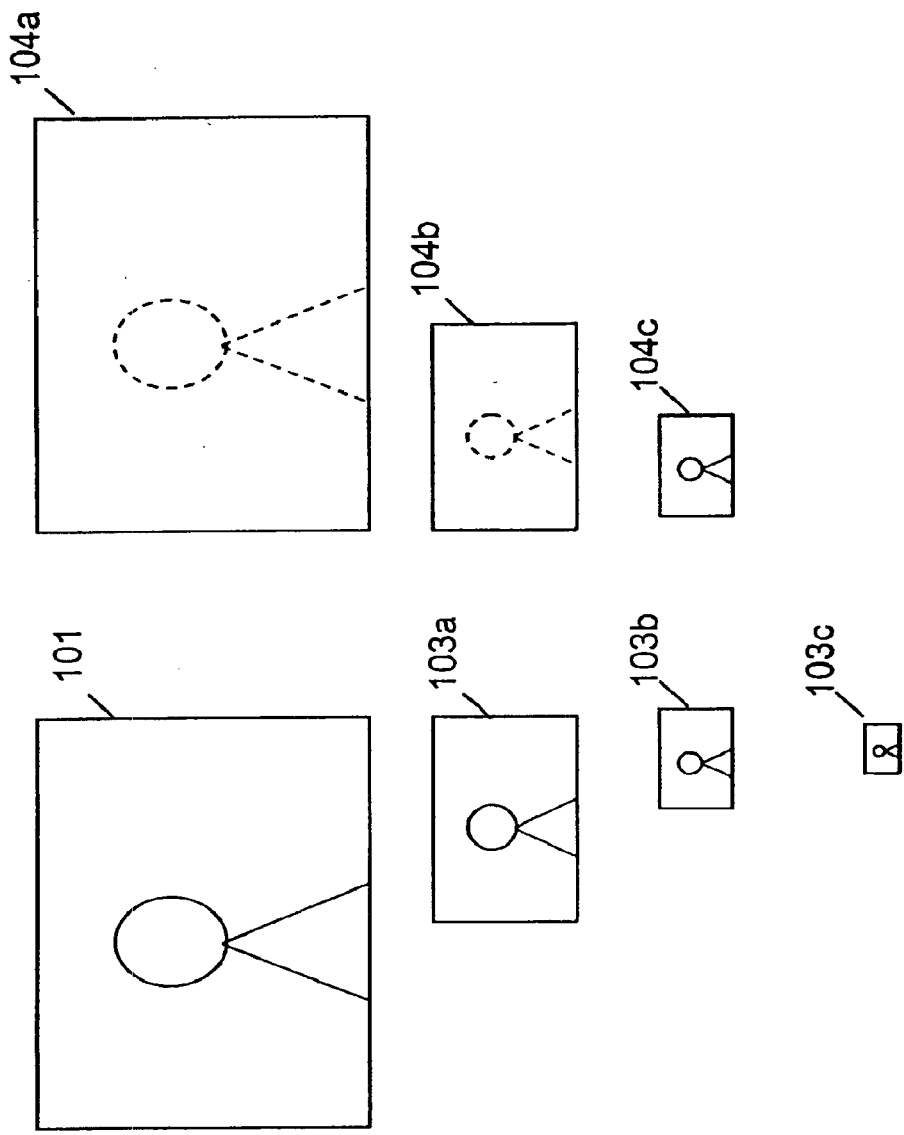
FIG. 5 is a diagram showing the relative sizes of the original digital image, the residual digital images, and the base digital images in accordance with the present invention.

One pass through the pyramid construction module 110 produces a base digital image and a residual digital image. The present invention uses the computer memory of the original digital image to store the newly generated residual digital image. The original digital image 101 and the interpolated digital image are discarded in computer memory since neither is needed to continue the processing. FIG. 5 shows a pictorial diagram of the digital images produced with the present invention by exercising multiple passes of the image data through the pyramid construction module 110. After each pass through the pyramid construction module 110 the base digital image of the previous pass is substituted for the original digital image 101 in the processing cycle. For example, after the first pass, base digital image 103*a* and residual digital image 104*a* are generated. With the second pass, the base digital image 103*a* is received and processed by the base filter module 130. The second pass through the pyramid construction module 110 generates base digital image 103*b* and residual digital image 104*b*. Similarly, the third pass through the pyramid construction module 110 starts by processing base digital image 103*b* with base digital image 103*c* and residual digital image 104*b* being generated. After three passes through the pyramid construction module 110 only the base digital image 103*c* and the residual digital images 104*a*, 104*b*, and 104*c* are stored in computer memory. The collection of the residual digital images and the lowest resolution base digital image constitutes a digital image pyramid representation. The last base digital image produced is referred to as the final base digital image.

Figure 6:
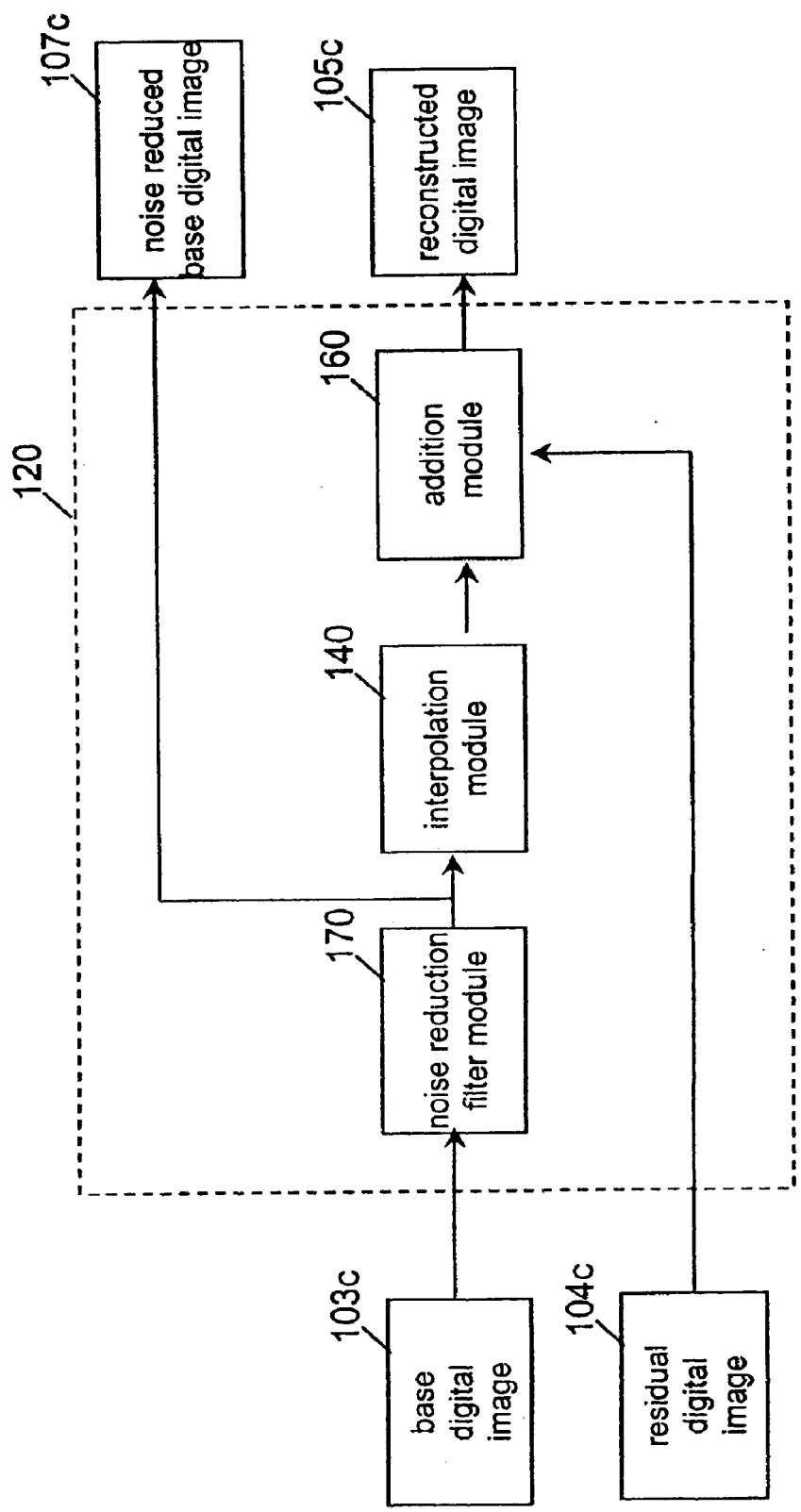
FIG. 6 is a functional block diagram showing in more detail the pyramid construction module of FIG. 3.

The pyramid reconstruction module 120 shown in FIG. 3 is illustrated in more detail in FIG. 6. The noise reduction filter module 170 receives and processes the base digital image 103*c* to produce a noise reduced base digital image 107*c*. The noise reduction filter module 170 removes noise from the base digital image 103*c* with the application of a noise reduction filter. The interpolation module 140 receives the noise reduced base digital image 107*c* and produces an interpolated noise reduced base digital image. The addition module 160 receives the interpolated noise reduced base digital image and the residual digital image 104*c* and generates a reconstructed digital image 105*c*. The addition module 160 and the difference module 150 perform inverse functions of one another. The difference module 150 of the present invention numerically subtracts the corresponding pixels of the two digital images it receives. The addition module 160 of the present invention adds the two digital images it receives. Thus, the reconstructed digital image 105*c* is the base digital image 103*b* with the noise removed. It is instructive to note that if the present invention is practiced without the application of the noise reduction filter, the reconstructed digital image 105*c* would be identical to the base digital image 103*b*. Those skilled in the art will recognize that the present invention can be practiced with other difference modules and addition modules. However, if different methods are used for the difference module 150 and the addition module 160 the best results will be obtained if the functions these two modules performs are mathematical inverses of one another.

Thus, one pass through the pyramid reconstruction module 120 generates a reconstructed image of the same resolution as the next pyramid level of the digital image pyramid representation. The process is repeated for each pyramid level by processing the reconstructed digital image from the previous pyramid level and the residual digital image of the next pyramid level. Therefore, on the second pass, the pyramid reconstruction module 120 receives the reconstructed digital image 105c and the residual digital image 104b and generates a reconstructed digital image 105b (not shown). Similarly, on the third pass, the pyramid reconstruction module 120 receives the reconstructed digital image 105b and the residual digital image 104a and generates a reconstructed digital image 105a (not shown). On the fourth and final pass, the reconstructed digital image 105a is received by the noise reduction filer module 170 within the pyramid reconstruction module 120 which removes noise from the reconstructed digital image 105a generating a noise reduced digital image 102. The original digital image 101 and the noise reduced digital image 102 are the same spatial resolution. The noise reduced digital image 102 is the original digital image 101 with noise removed.

Several aspects of the noise removal process of the present invention should be noted. Since the noise reduction filter module 170 is applied to a base digital image, and a base digital image has the same functional form as the original digital image 101, the present invention can be practiced with any noise reduction filter that can receive and process the original digital image 101. Furthermore, although the present invention uses the same noise reduction filter at each pyramid level, or pass through the noise reduction filter module 170, this is not a requirement of the present invention. Thus, different noise reduction filters can be used for the different pyramid levels. This can yield noise removal performance advantages if analysis shows that the characteristics of the noise for a particular source of digital images varies as a function of spatial frequency.

Another important aspect of the present invention relates to the flexibility of different spatial resolutions of noise reduced digital images produced. Since the present invention produces base digital images 103a, 103b, and 103c with successively smaller spatial resolution, any of the corresponding noise reduced based digital images produced by the pyramid reconstruction module 120 can be saved in computer memory for use as output or received by another digital imaging application for further processing. Therefore, the present invention can be used for digital imaging applications that make use of a noise reduced digital image of lower resolution than the original digital image 101. It is also not a requirement of the present invention that the final processed digital image be the same spatial resolution as the original digital image 101.

Referring to FIG. 4, the base filter module 130 receives the original digital image 101 and generates a base digital image 103a. As a first step in generating a base digital image a spatial filter is convolved with the pixel data of the original digital image 101. Since the generated base digital image is of lower spatial resolution than the original digital image 101, it is not necessary to apply the spatial filter to all pixels of the original digital image 101. The preferred embodiment of the present invention uses two one-dimensional Gaussian filters oriented orthogonally to one another. The same actual spatial filter kernel data is used for both spatial orientations.

The values of the one-dimensional Gaussian filter is given by equation (1) for a normalized one by 5 pixel spatial filter.

$$0.025 \quad 0.707 \quad 1.000 \quad 0.707 \quad 0.025 \tag{1}$$

The spatial filtering and spatial sampling performed by the base filter module 130 is accomplished in a two pass operation. A horizontal one-dimensional Gaussian filter is convolved with the pixel data of the original digital image 101 to produce an first pass image. In this operation, the horizontal one-dimensional Gaussian filter is applied to every other horizontal pixel. Therefore the horizontal dimension of the first pass image is one half that of the original digital image 101 and the vertical dimension of the first pass image is equal to that of the original digital image 101. On the second pass of the spatial filtering operation, a vertical one-dimensional Gaussian filter is convolved with the pixel data of the first pass image to produce the base digital image 103a. In this operation, the vertical one-dimensional Gaussian filter is applied to every other vertical pixel. Therefore the horizontal dimension of the base digital image 103a is one half that of the original digital image 101 and the vertical dimension of the base digital image is one half that of the original digital image 101. Thus, the base filter module 130 performs both a spatial filtering operation and a sampling operation by applying the Gaussian filter to selected pixels. The present invention uses a five element spatial filter. Those skilled in the art will recognize that the present invention can be used with other Gaussian filters with more or less elements and non-Gaussian filters and still derive benefits of the present invention.

In an alternative embodiment of the present invention a two dimensional spatial filter is used to generate the base digital image 103a. In particular a two-dimensional Gaussian spatial filter kernel is used. In this operation, the two dimensional spatial filter is applied to every other horizontal pixel and every other vertical pixel. As with the preferred embodiment of the present invention, the horizontal dimension of the base digital image 103a is one half that of the original digital image 101 and the vertical dimension of the base digital image is one half that of the original digital image 101. This alternative embodiment of the present invention uses a 5 by 5 element spatial filter. Those skilled in the art will recognize that the present invention can be used with other Gaussian filters with more or less elements and non-Gaussian low-pass filters and still derive benefits of the present invention. Those skilled in the art will also recognize that the spatial sampling operation and the spatial filtering operation performed by the base filter module 130 can be separated into to distinct operations.

Referring to FIG. 4, the interpolation module 140 receives the base digital image 103a and generates an interpolated base digital image of the same spatial resolution as the original digital image 101. The operation of the interpolation module 140 is a two step process. In the first step, the pixel data from the base digital image 103a is up-sampled to populate pixels of the interpolated base digital image. At this stage, every even pixel of every even row in the interpolated base digital image has an assigned pixel value taken from the base digital image 103a. Also, every odd pixel of every even row in the interpolated base digital image does not have an assigned value nor does every pixel of every odd row. The present invention uses a bi-linear interpolation method to generate the missing pixel values. For every odd pixel of every even row in the interpolated base digital image the average of the two nearest horizontal pixel values is used to assign the missing pixel value. Similarly, for every even pixel of every odd row in the interpolated base digital image the average of the two nearest vertical pixel values is used to assign the missing pixel value. Lastly, for every odd pixel of every odd row in the interpolated base digital image, the average of the two nearest horizontal pixel values is used to assign the missing pixel value. This is mathematically equivalent to using the nearest two vertical pixel value or using the nearest four sampled pixel values from the base digital image 103a. Those skilled in the art will recognize that operation of the interpolation module 140 does not need to be performed as separate steps. It is also possible to implement the present invention in a one step process of up-sampling and interpolation.

The essential aspect of the interpolation filter used is generation of an interpolated base digital image of the same resolution as the original digital image 101. The present uses the bi-linear interpolation filter for its computational efficiency and overall acceptable quality. The present invention can be practiced with other interpolation filters. In an alternative embodiment of the present invention a bi-cubic interpolation filter is used as described by Press et al. their publication "Numerical Recipes the Art of Scientific Computing" produced by the Cambridge University Press on pages 98 through 101. Although the bi-cubic interpolation filter generally produces higher quality result as compared with the bi-linear interpolation filter, more pixels must be used from a local neighborhood of pixels to generate the missing pixel values thus requiring more computational resources.

The interpolation module 140 described above is used for both the pyramid construction processing as well as the pyramid reconstruction processing. The action of the interpolation module 140 is the same in either case. However, the resultant image produced by the interpolation module 140 shall be called the interpolated base digital image for the pyramid construction process since a noise reduction filter has not yet been applied to the base digital image. Similarly for the pyramid reconstruction process, the result of the interpolation module 140 shall be called the interpolated noise reduced base digital image since a noise reduction filter has been applied to the base digital image.

Figure 7:
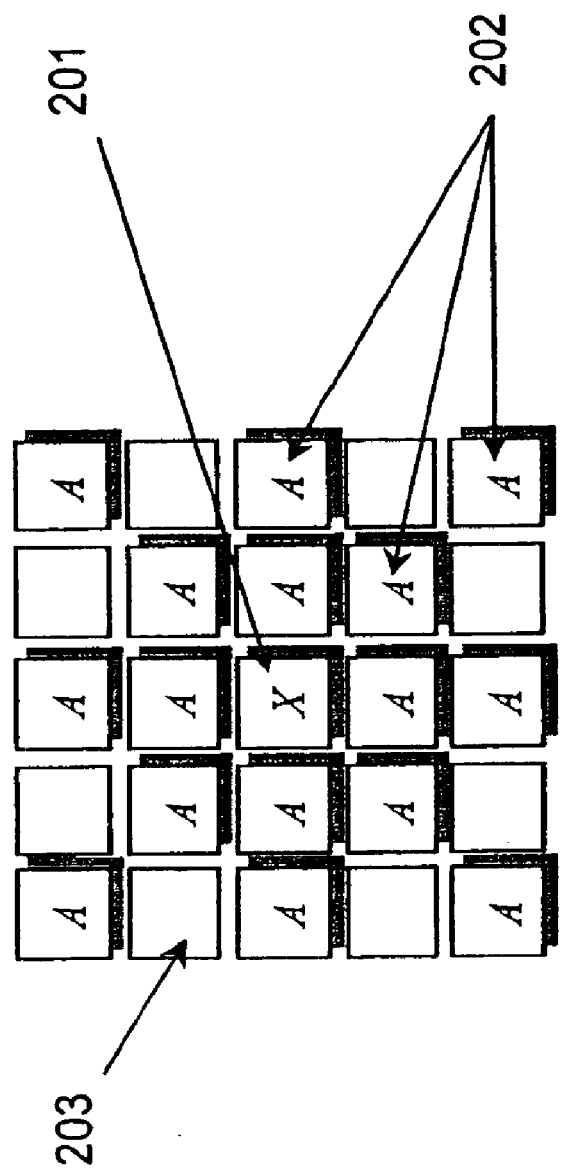
FIG. 7 is a diagram of the pixels geometry employed by a noise reduction filter.

Referring to FIG. 6, the noise reduction filter module 170 receives a base digital image and generates a noise reduced base digital image by applying a noise reduction filter to the pixels of the base digital image. The present invention can be used with any noise reduction filter designed to by applied to a digital image. The preferred embodiment of the present invention uses a modified implementation of the Sigma filter, described by Jong-Sen Lee in the journal article *Digital Image Smoothing and the Sigma Filter*, Computer Vision, Graphics, and Image Processing Vol 24, p. 255–269, 1983, as a noise reduction filter to enhance the appearance of the processed digital image. The values of the pixels contained in a local neighborhood of n by n pixels where n denotes the length of pixels in either the row or column direction, are compared with the value of the center pixel, or pixel of interest. Each pixel in the local neighborhood of pixels is given a weighting factor of one or zero based on the absolute difference between the value of the pixel of interest and the local pixel value, i.e. a difference pixel value. If the absolute value of the pixel value difference is less or equal to a threshold value $\epsilon$, the weighting factor if set to one. Otherwise, the weighting factor is set to zero. The numerical constant $\epsilon$ is set to two times the expected noise standard deviation. Mathematically the expression for the calculation of the noise reduced pixel value is given as $$q_{mn} = \Sigma_{ij} a_{ij} p_{ij} / \Sigma_{ij} a_{ij} \qquad (2)$$

and $a_{ij} = 1$ if $|p_{ij} - p_{mn}| <= \epsilon$ $a_{ij} = 0$ if $|p_{ij} - p_{mn}| > \epsilon$ where $p_{ij}$ represents the $ij^{th}$ pixel contained in the local neighborhood of pixels, $p_{mn}$ represents the value of the pixel of interest located at row m and column n, $a_{ij}$ represents a weighting factor, and $q_{mn}$ represents the noise reduced pixel value. Typically, a local neighborhood of pixels centered about the center pixel is used with the indices i and j varied to sample the local pixel values for Sigma filter applications. The preferred embodiment of the present invention uses a radial pattern of pixels within an n by n the local neighborhood of pixels as illustrated in FIG. 7. The pixel of interest 201 is shown in the center with local pixels 202 shown in a radial pattern about the pixel of interest 201. The pixel locations 203 shown without letter designations are not used in the calculation of the noise reduced pixel values.

The present invention also incorporates a signal dependent noise feature through a modification of the expression for the threshold $\epsilon$ given by equation (3)

$$\epsilon = Sfac \; \sigma_n(p_{mn}) \qquad (3)$$

where $\sigma_n$ represents the noise standard deviation of the base digital image evaluated at the center pixel value $p_{mn}$ as described above. It is not a requirement that the threshold $\epsilon$ be evaluated at the pixel of interest. However, it is important that the threshold $\epsilon$ be a function of the values of pixels of the local neighborhood. The parameter Sfac is a scale factor, or control parameter, that can be used to vary the degree of noise reduction. The optimal value for the Sfac parameter has been found to be 1.5 through experimentation however values ranging from 1.0 to 3.0 can also produce acceptable results. The noise reduced pixel value $q_{mn}$ is calculated as the division of the two sums. The process is completed for some or all of the pixels contained in the digital image channel and for some or all the digital image channels contained in the digital image.

The modified Sigma filter employed by the present invention is an example of a noise reduction filter that is adaptive since it changes in response to the signal content of the pixels values of the digital image. The modified implementation of the Sigma filter is also an example of a noise reduction filter that uses a noise characteristic table. That is, the values of $\sigma_n$ are tabulated in a table of noise standard deviation values as function of the digital image channel and numerical pixel values. An example of a noise characteristic table for $\sigma_n$ is given in Table 1 for a digital image having red, green, and blue digital image channels. Since the noise characteristics of most digital images is a function of spatial resolution, the present invention uses a different noise characteristic table for processing different pyramid levels.

TABLE 1

| average pixel value | Standard deviation of red channel | Standard deviation of green channel | Standard deviation of blue channel |
| --- | --- | --- | --- |
| 16 | 3.28 | 3.62 | 3.21 |
| 48 | 3.71 | 3.20 | 3.38 |
| 80 | 3.77 | 4.14 | 4.50 |
| 112 | 4.57 | 4.35 | 4.21 |
| 144 | 4.98 | 4.25 | 4.37 |
| 176 | 5.05 | 4.11 | 6.21 |
| 208 | 5.05 | 5.64 | 6.29 |
| 240 | 2.71 | 4.27 | 3.87 |

The sigma filter as described by Lee is one example of a pixel difference filter. The central aspect of a pixel difference filter is a spatial filter that calculates a noise reduced pixel value based on the pixel values in a local neighborhood of pixels about a pixel of interest, wherein the influence of each local pixel is based on the difference between the local pixel value and a reference numerical value (difference pixel value) derived from the pixels in the local neighborhood. The preferred embodiment of a pixel difference filter used in the present invention uses the pixel of interest as the reference numerical value. Other values such as the average of pixels in the local neighborhood can also be used as the reference numerical value.

Another example of a pixel difference filter is the Inverse Gradient Filter described by D. C. C. Wang et al. in their published paper *Gradient Inverse Weighted Smoothing Scheme and the Evaluation of its Performance*, Computer Graphics and Image Processing Vol 15, p. 167–181, 1981. This algorithm produced a noise reduced image by taking a non-linear weighting of local pixel values from a rectangular sampling region about the center pixel. The weighting factor was based on the magnitude difference between the center pixel and the surrounding pixel value.

An alternative embodiment of the present invention uses a median filter as the noise reduction logic to form the noise reduced pixel value. Thus, for the median filter embodiment no a priori knowledge of the noise associated with the original digital image 101 is required.

Since the present invention performs more than one pass through the pyramid construction module 110 and the pyramid reconstruction module 120, it is possible to practice the present invention in a mode wherein a different noise reduction filter is employed by the noise reduction filter module 170 for different pyramid levels. For example, a median filter can be used for the first pass while the Sigma filter can be used for the other passes. This feature of the present invention allows the system designer of the digital imaging application the ability to tailor the present invention for particular sources of digital images. For the example described above, a median filter works well for digital images corrupted by spurious noise. Thus, using a median filter for the highest spatial frequency components of noise is more effective for reducing spurious noise. For the lower spatial frequency components of the same digital images Gaussian additive noise may dominate. Therefore, employing the Sigma filter for the other pyramid levels would be more effective than using the median filter for all pyramid levels.

The preferred embodiment of the present invention employs the noise reduction filter during the pyramid reconstruction phase of the processing. In an alternative embodiment, the noise reduction filter is employed during the pyramid construction phase of the processing. In this alternative embodiment, the processing steps are essentially the same as for the preferred embodiment with the exception of the placement of the noise reduction filter module 170 prior to the employment of the based filter module 130 within the pyramid construction module 110. Similarly, the processing steps are essentially the same as for the preferred embodiment with the exception of the omission of the noise reduction filter module 170 within the pyramid reconstruction module 120.

Figure 8:
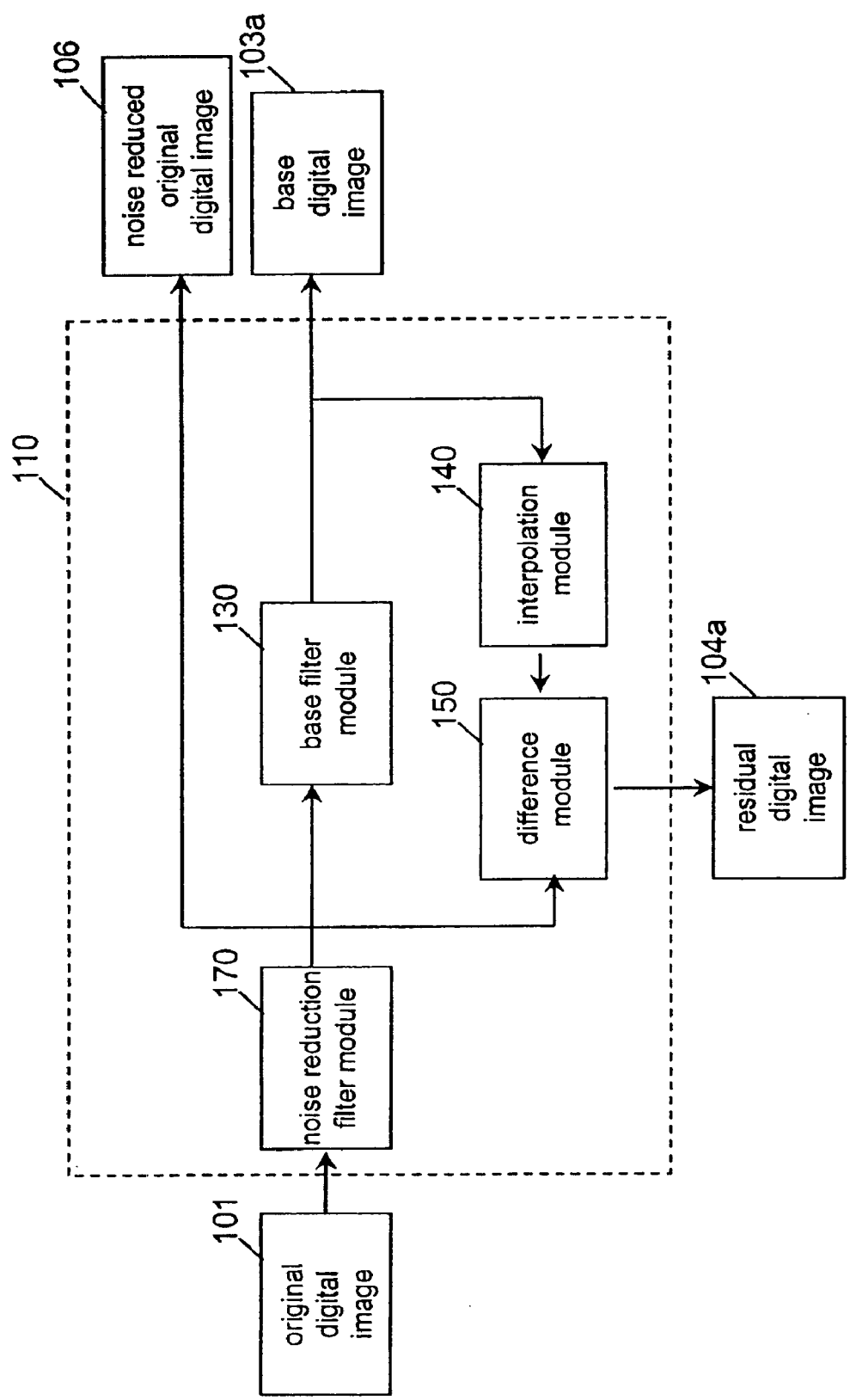
FIG. 8 is a functional block diagram of another embodiment of pyramid construction module as shown in FIG. 3.

Referring to FIG. 8, the pyramid construction module 110 shown in FIG. 3 is illustrated in more detail. The original digital image 101 is received and processed by the noise reduction filter 170 to produce a noise reduced original digital image 106. The noise reduced original digital image 106 is received by the base filter module 130 which applies a spatial filter to the noise reduced original digital image 106 which both smoothes and samples the pixel data. The resultant base digital image 103a is a lower spatial resolution version of the noise reduced original digital image 106. The base digital image 103a is received by the interpolation module 140 and produces an interpolated base digital image which is a higher spatial resolution version of the base digital image 103a i.e. essentially the same spatial resolution as the noise reduced original digital image 106. The difference module 150 receives the interpolated base digital image and the noise reduced original digital image 106 and produces a residual digital image 104a.

After each pass through the pyramid construction module 110 shown in FIG. 8, the base digital image of the previous pass is substituted for the original digital image 101 in the processing cycle. For example, after the first pass, base digital image 103a, residual digital image 104a, and noise reduced original digital image 106 are generated. With the second pass, the base digital image 103a is received and processed. The second pass through the pyramid construction module 110 generates base digital image 103b, residual digital image 104b, and noise reduced base digital image 107a (not shown). Similarly, the third pass through the pyramid construction module 110 starts by processing base digital image 103b with base digital image 103c, residual digital image 104c, and noise reduced base digital image 107b (not shown) being generated. At the end of the pyramid construction processing the last base digital image, in this example 103c, is processed with the noise reduction filter module 170 resulting in noise reduced base digital image 107c (not shown). Therefore, after the noise filtering and pyramid construction processing is completed, the noise reduced original digital image 106a, and noise reduced based digital images 107a, 107b and 107c form a noise reduced image pyramid representation of the original digital image 101.

Figure 9:
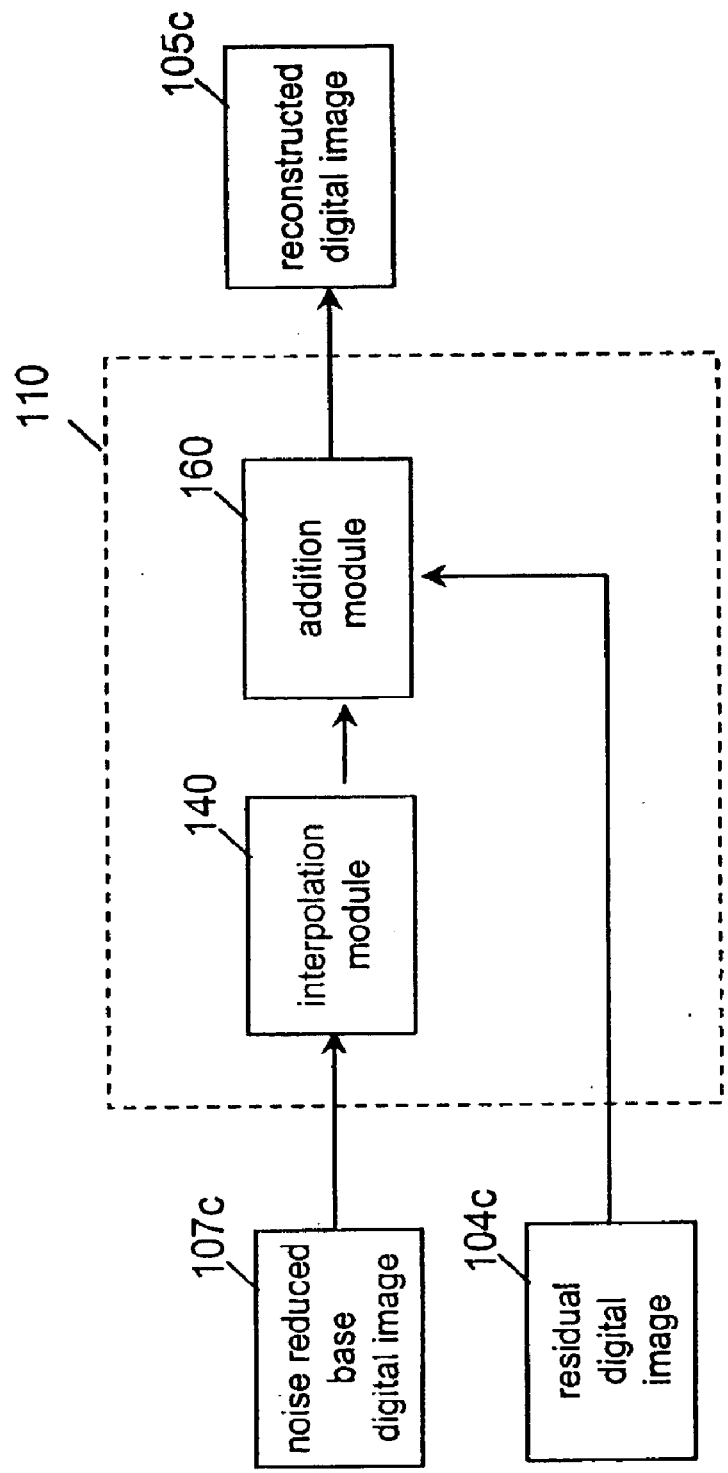
FIG. 9 is a functional block diagram of another embodiment pyramid reconstruction module as shown in FIG. 3.

Referring to FIG. 9, the corresponding alternative embodiment of the pyramid reconstruction module 120 is illustrated in more detail. The interpolation module 140 receives the noise reduced base digital image 107c and produces an interpolated noise reduced base digital image. The addition module 160 receives the interpolated noise reduced base digital image and the residual digital image 104c and generates a reconstructed digital image 105c. The process is repeated for each pyramid level by processing the reconstructed digital image from the previous pyramid level and the residual digital image of the next pyramid level. Therefore, on the second pass, the pyramid reconstruction module 120 receives the reconstructed digital image 105c and the residual digital image 104b and generates a reconstructed digital image 105b (not shown). Similarly, on the third pass, the pyramid reconstruction module 120 receives the reconstructed digital image 105b and the residual digital image 104a and generates the noise reduced digital image 102.

Figure 10:
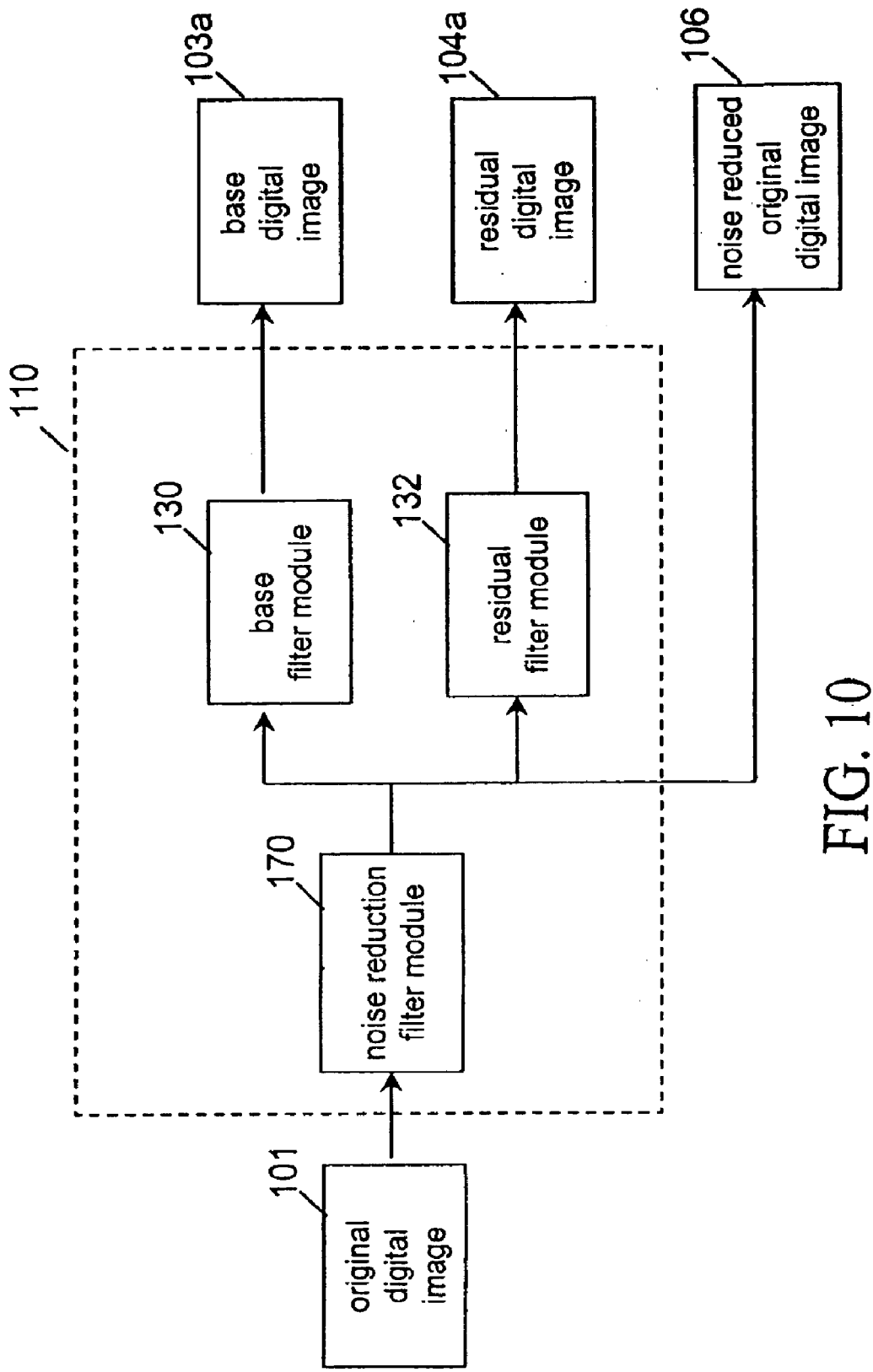
FIG. 10 is a functional block diagram of another embodiment pyramid construction module as shown in FIG. 3.

An important aspect of the present invention is the ability to use a variety of different digital image pyramid representations. An alternative embodiment of the present invention uses a digital image pyramid representation based on the wavelet transform as described by Adelson et al. in U.S. Pat. No. 5,526,446. FIG. 10 shows the details of the pyramid construction module 110 for this alternative embodiment. The noise reduction filter module 170 receives and processes the original digital image 101 resulting in a noise reduced original digital image 106. The noise reduced original digital image 106 is received by the base filter module 130 which generates a base digital image 103a containing the low resolution wavelet coefficients produced by the application of the wavelet transform. The noise reduced original digital image 106 is also received by the residual filter module 132 which produces a residual digital image 104a containing the high frequency wavelet coefficients produced by the application of the wavelet transform. The wavelet transform is accomplished through the application of wavelet filters, i.e. spatial filters applied to image pixel data. The residual digital image 104a actually contains three high frequency wavelet coefficient elements, one corresponding to the horizontally filtered image, one corresponding to the vertically filtered image, and one corresponding to the vertically and horizontally filtered image. Each high frequency wavelet coefficient element is a digital image having half the linear spatial resolution as the noise reduced original digital image 106.

Figure 11:
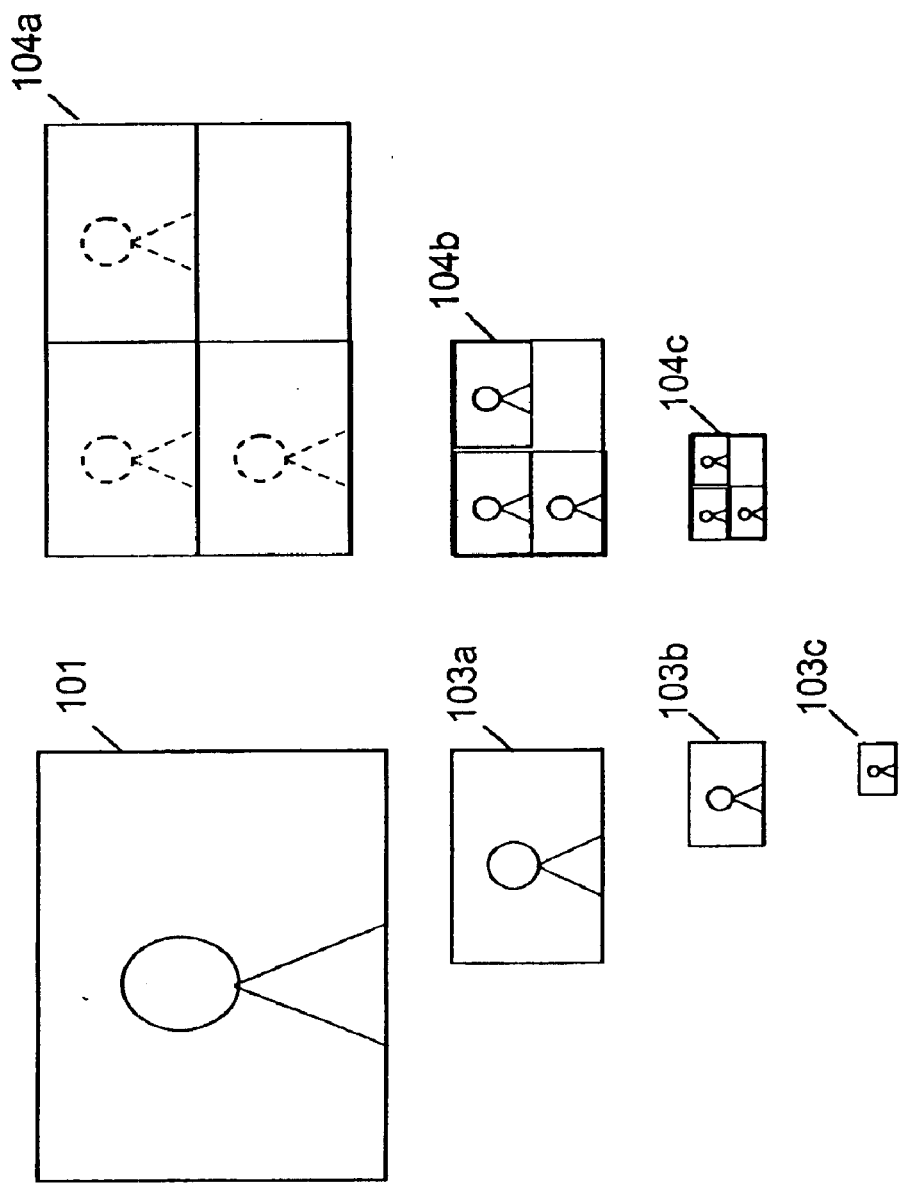
FIG. 11 is a diagram showing the relative sizes of the original digital image, the residual digital images, and the base digital images in an alternative embodiment in accordance with the present invention.

On the second pass of the pyramid construction module 110, the base digital image 103a is substituted for the original digital image 101 and processed in similar manner. The second pass of the wavelet transform yields base digital image 103b, residual digital image 104b and noise reduced base digital image 107a. The present invention uses a three level digital image pyramid representation. Thus, base digital images 103b and 103c, residual digital images 104b and 104c and noise reduced base digital image 107a and 107b are generated. At the end of the pyramid construction processing the last base digital image 103c is processed with the noise reduction filter module 170 resulting in noise reduced base digital image 107c. Therefore, after the noise filtering and pyramid construction processing is completed, the noise reduced original digital image 106, and noise reduced based digital images 107a, 107b and 107c form a wavelet noise reduced image pyramid representation of the original digital image 101. Those skilled in the art will recognize that the present invention can be used to generate a lesser or greater number of pyramid levels. The base digital images and residual digital images produced with this wavelet based alternative embodiment are shown pictorially in FIG. 11.

Figure 12:
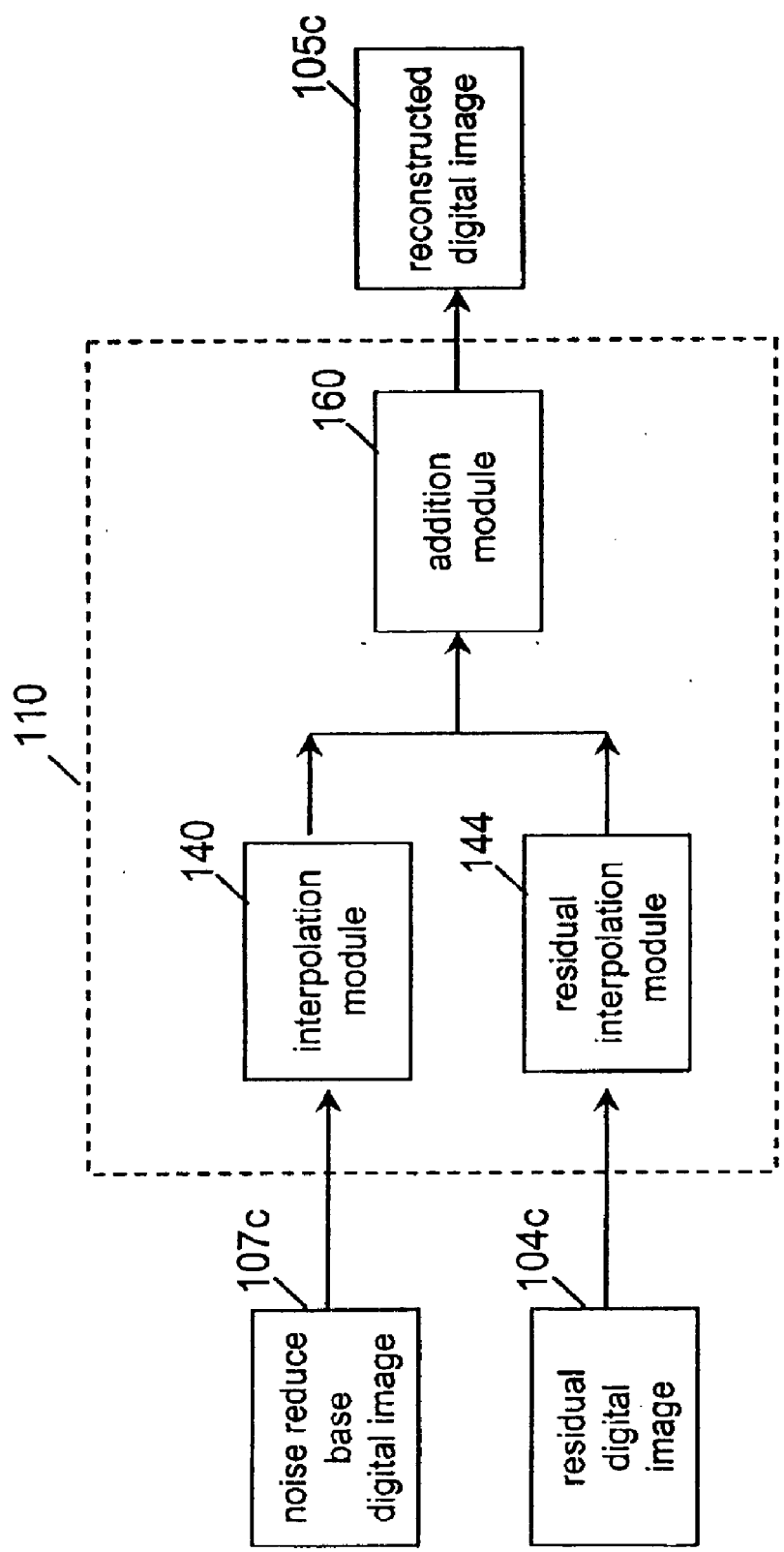
FIG. 12 is a functional block diagram of another embodiment pyramid reconstruction module as shown in FIG. 3.

The details of the pyramid reconstruction module 120 for this wavelet based alternative embodiment are shown in FIG. 12. The noise reduced base digital image 107c is received by the interpolation module 140 which uses the low resolution wavelet coefficients to generate an interpolated noise reduced base digital image. The residual digital image 104c is received by the residual interpolation module 144 which uses the high frequency wavelet coefficient elements to generate a reconstructed residual digital image. The interpolated noise reduced base digital image and the reconstructed residual digital image are received by the addition module 160 which adds the interpolated noise reduced base digital image and the three elements of the reconstructed residual digital image to form the reconstructed digital image 105c. The operation of the pyramid reconstruction module 120 is repeated with the reconstructed digital image 105c substituted for the noise reduced base digital image 107c which results in a reconstructed digital image 105b (not shown) and again to generate the noise reduced digital image 102 (not shown).

Another alternative embodiment of the present invention uses a digital image pyramid representation based on the Direct Cosine Transform (DCT) as described by Wober et al. in U.S. Pat. No. 5,729,631. FIG. 10 shows the details of the pyramid construction module 110 for this alternative embodiment. The noise reduction filter module 170 receives and processes the original digital image 101 resulting in a noise reduced original digital image 106. The noise reduced original digital image 106 is received by the base filter module 130 which generates a base digital image 103a containing the DC low frequency components of produced by the application of the Direct Cosine Transform. The reduced noise original digital image 106 is also received by the residual filter module 132 which produces a residual digital image 104a containing the DCT high frequency coefficients produced by the application of the Direct Cosine Transform, i.e. a set of Direct Cosine Transform filters. The residual digital image 104a has essentially the same spatial resolution as the noise reduced original digital image 106. The base digital image 103a is one eight the spatial resolution as the noise reduced original digital image 106 in each dimension and thus contains one sixty fourth as many pixels as the noise reduced original digital image 106. On the second pass of the pyramid construction module 110 the base digital image 103a is substituted for the original digital image 101 and processed in similar manner. The present invention uses a two level digital image pyramid representation for this alternative embodiment due to eight to one spatial resolution reduction of the DCT. Thus, base digital images 103a and 103b, residual digital images 104a and 104b and noise reduced base digital image 107a are generated. The base digital image 103b is processed with the noise reduction filter module 170 to produce the noise reduced base digital image 107b. Those skilled in the art will recognize that the present invention can be used a lesser or greater number of pyramid levels. This alternative embodiment illustrates that the present invention can be practiced with digital image pyramid representations for which the different pyramid levels differ by a linear spatial resolution factor other than two.

Figure 13:
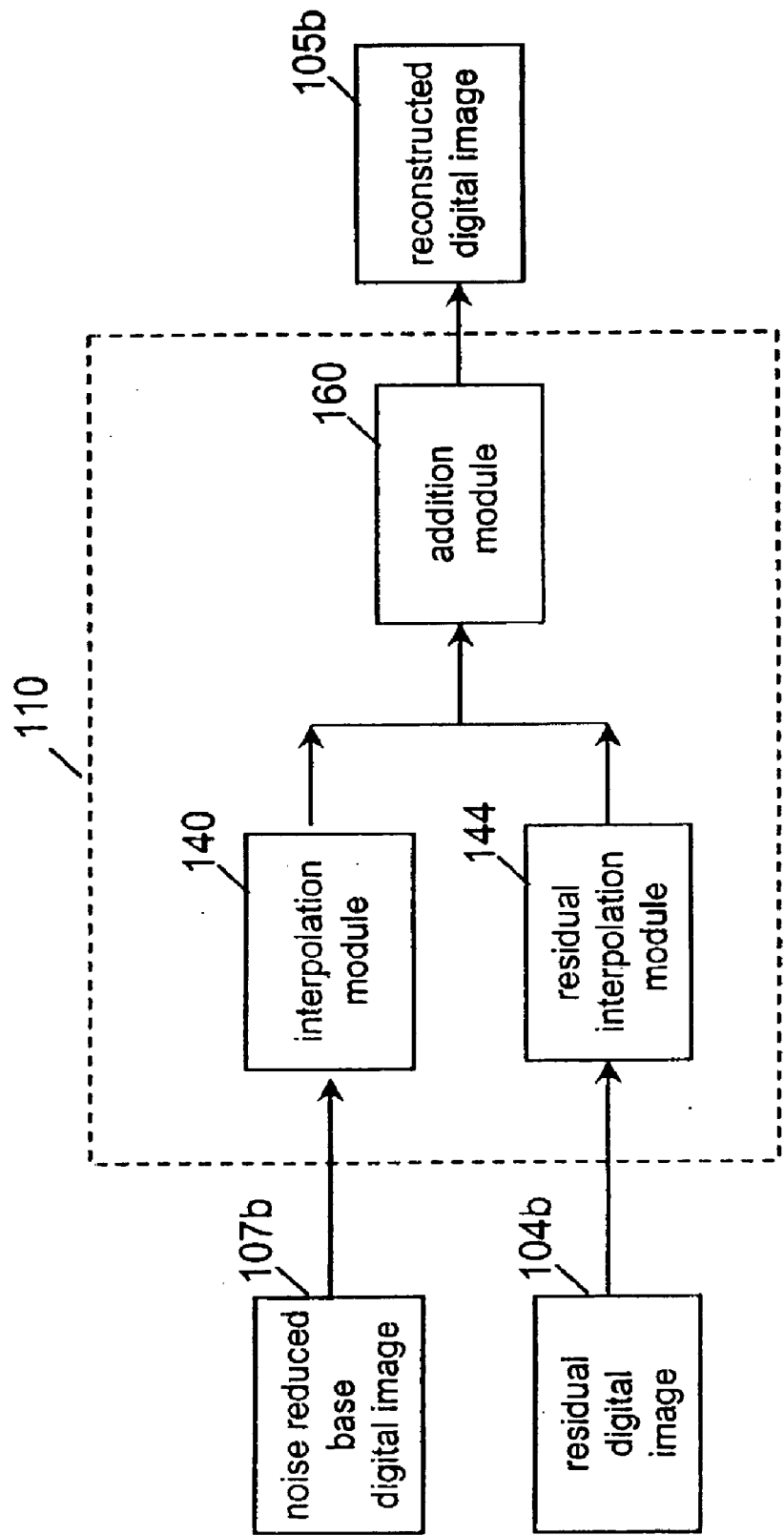
FIG. 13 is a functional block diagram of another embodiment pyramid reconstruction module as shown in FIG. 3.

The details of the pyramid reconstruction module 120 for this alternative embodiment are shown in FIG. 13. The noise reduced base digital image 107b is received by the interpolation module 140 which uses the DC low frequency component values to form an interpolated noise reduced base digital image. The residual digital image 104b is received by the residual interpolation module 144 which uses the DCT high frequency coefficient values to generate a reconstructed residual digital image. The interpolated noise reduced base digital image and the reconstructed residual digital image are received by the addition module 160 which adds these two input digital images to form the reconstructed digital image 105b. The operation of the pyramid reconstruction module 120 is repeated with the reconstructed digital image 105b substituted for the noise reduced base digital image 107b which results in a noise reduced digital image 102.

The present invention can be applied to digital images in variety of color representations. While the preferred embodiment of the present invention processes color digital images in a red, green, and blue color representation, an alternative embodiment receives color digital images in a luminance-chrominance color representation including a luminance digital image channel and two chrominance digital image channels, i.e. having a luminance component and two chrominance components. A 3 element by 3 element matrix transformation can be used to convert the red, green, and blue pixel values of an RGB color digital image into luminance and chrominance pixel values. Let $R_{ij}$, $G_{ij}$, and $B_{ij}$ refer to the pixel values corresponding to the red, green, and blue digital image channels located at the $i^{th}$ row and $j^{th}$ column. Let $L_{ij}$, $C1_{ij}$, and $C2_{ij}$ refer to the transformed luminance, first chrominance, and second chrominance pixel values respectively of an LCC original digital image. The 3 element by 3 elements of the matrix transformation are described by equation (4).

$$L_{ij}=0.333\ R_{ij}+0.333\ G_{ij}+0.333\ B_{ij} \quad (4)$$

$$C1_{ij}=-0.25\ R_{ij}+0.50\ G_{ij}-0.25\ B_{ij}$$

$$C2_{ij}=-0.50\ R_{ij}+0.50\ B_{ij}$$

Those skilled in the art will recognize that the exact values used for coefficients in the luminance/chrominance matrix transformation may be altered and still yield substantially the same effect. An alternative also used in the art is described by equation (5).

$$L_{ij}=0.375\ R_{ij}+0.500\ G_{ij}+0.125\ B_{ij} \quad (5)$$

$$C1_{ij}=-0.25\ R_{ij}+0.50\ G_{ij}-0.25\ B_{ij}$$

$$C2_{ij}=-0.50\ R_{ij}+0.50\ B_{ij}$$

In this alternative embodiment, the $L_{ij}$, $C1_{ij}$, and $C2_{ij}$ pixel values each represent pixel values of different digital image channels. The present invention processes the L luminance digital image channel pixel data separately from the C1 and C2 chrominance digital image channel pixel data. As with the RGB color representation case, this LCC color representation case generates an image pyramid representation separately for the L, C1, and C2 digital image channels. The noise reduction filter is applied to the base digital images as part of either the pyramid reconstruction or pyramid reconstruction processing. The present invention uses a noise characteristic table for the modified Sigma filter that corresponds to the noise in the L, C1, and C2 digital image channels. This alternative embodiment may be useful for digital imaging systems that have other image processing modules that expect to receive an LCC color representation digital image. By using this implementation of the present invention, unnecessary conversions from different color representations can be avoided.

The LCC color representation method is useful particularly for removing noise from digital images produced with digital cameras. Unlike most sources of digital images, the digital images produced by digital cameras often have more noise in the chrominance signals than in the luminance signal. In a still further alternative embodiment of the present invention an LCC color representation original digital image is processed. Similarly, a noise characteristic table is used for the modified Sigma filter that corresponds to the noise in the L, C1 and C2 digital image channels. In this alternative embodiment, a value of 4.0 is used for the scale factor parameter Sfac of equation (3) is used for the C1 and C2 chrominance digital image channels and a value of 1.5 is used for the L luminance digital image channel. These parameter settings effectively remove more noise from the chrominance digital image channels than luminance digital image channel. Although it good results can be obtained by using the scale factor parameter Sfac value for all three digital image channels, better results are obtained for digital camera digital images by using larger values of the scale factor parameter for the chrominance digital image channels. This is probably due to the fact that over smoothing the chrominance signals of images is less objectionable than over smoothing the luminance signals from a human visual perspective. Alternatively, the present invention can be used by processing the chrominance digital image channels and not removing noise from the luminance digital image channel.

The present invention can be employed with any number of pyramid levels. Noise in images is generally a function of spatial resolution and is also more objectionable for the higher spatial resolution pyramid levels. The optimal number of pyramid levels to used with the present invention depends on the noise removal goals of the digital imaging system designer and on the size of the digital images being processed. The preferred embodiment of the present invention uses four pyramid levels for effective noise removal for digital images of size 1024 by 1536 pixels. For processing digital images of greater spatial resolution, such as 2048 by 3072 pixel, five pyramid levels are used. For processing digital images of lower spatial resolution, such as 512 by 768 pixels, 3 pyramid levels are used.

Those skilled in the art will recognize that the present invention can be used either in whole as described above, or in part and still substantially achieve the benefits of the present invention. For example, the noise reduction filter can be applied to only selected pixels of a base digital image or original digital image. Similarly, the noise reduction filter need not be applied to all of the base digital images of an image pyramid representation. In an alternative embodiment of the present invention, the noise reduction filter is not applied to the reconstructed digital image 105a which leaves the highest spatial frequency components of noise in the processed digital image. For this alternative embodiment the noise reduced digital image 102 is the reconstructed digital image 105a and results in noise reduced digital images which have just the lower spatial frequency components removed.

Reviewing the present invention, an image pyramid representation of an original digital image 101 is made. This representation includes at least one noise reduced base digital images having lower spatial resolution than an original digital image 101 wherein the base digital image has noise removed therefrom. As has been described above, at least one residual digital image should be formed, but the present invention can also function with two or more residual digital images. In any case, when the noise reduced base digital image(s) and the residual digital image(s) are combined, they form a reconstructed digital image wherein noise found in the original digital image is not present in the reconstructed digital image.

The method of removing noise from the original digital image 101 includes the following steps which create and use the image pyramid representation. After receiving the original digital image including a plurality of pixels, the residual digital image(s) is produced and the base digital image(s) is produced from the original image. In all cases, the base digital image(s) has a lower spatial resolution than the original digital image. The noise reduced base digital image (s) is provided by removing noise from the base digital image(s). This is accomplished with a noise reduction filter so that when the noise reduced base digital image(s) is combined with the residual digital image(s) a reconstructed digital image is produced wherein noise is not present in the reconstructed digital image.

The present invention can be provided in a computer program which is stored on a computer readable storage medium which produces the image pyramid representation and uses such representation to create a reconstructed digital image as discussed above. Such a medium can comprise for example; a magnetic disk (such as a floppy disk), magnetic tape, code bars, solid state electronic storage devices (such as random access memories or read only memories), or any other physical device or medium which can be employed to store a computer program.

The invention has been described in detail with particular reference to certain preferred embodiments thereof, but it will be understood that variations and modifications can be effected within the spirit and scope of the invention.

PARTS LIST 10 image capture device
20 digital image processor
30 image output device
40 general control computer
50 display device
60 input control device
70 offline memory device
100 pyramid noise reduction module
101 original digital image
102 noise reduced digital image
103a base digital image
103b base digital image
103c base digital image
104a residual digital image
104b residual digital image
104c residual digital image
105a reconstructed digital image
105b reconstructed digital image
105c reconstructed digital image
106 noise reduced original digital image
107a noise reduced base digital image
107b noise reduced base digital image
107c noise reduced base digital image
109 enhancement transform module
110 pyramid construction module
120 pyramid reconstruction module
130 base filter module
132 residual filter module
140 interpolation module
144 residual interpolation module
150 difference module
160 addition module
170 noise reduction filter module
201 pixel of interest
202 pixel location
203 pixel location

What is claimed is:

1. In a method of removing noise from a digital image, comprising:
   a) receiving an original digital image including a plurality of pixels;
   b) generating at least one residual digital image and at least one base digital image from the original digital image, the base digital image having a lower spatial resolution than the original digital image; and
   c) generating a noise reduced base digital image by removing noise from the base digital image with a noise reduction filter so that when the noise reduced base digital image is combined with the residual digital image to produce a reconstructed digital image, noise is reduced in the reconstructed digital image as compared to the original digital image.

2. The method of claim 1 further including:
   d) using the residual digital image and the noise reduced base digital image to produce the reconstructed digital image.

3. The method of claim 2 wherein the reconstructed digital image has the same spatial resolution as the original digital image.

4. The method of claim 2 wherein the reconstructed digital image has a lower spatial resolution as the original digital image.

5. The method of claim 2 further including further removing noise from the reconstructed digital image by using the noise reduction filter.

6. The method of claim 2 further including:
   generating an interpolated base digital image by spatially filtering the base digital image with an interpolation filter; and
   generating the residual digital image by combining the interpolated base digital image with the original digital image.

7. The method of claim 6 wherein combining the interpolated base digital image with the original digital image includes calculating the difference between the interpolated base digital image and the original digital image.

8. The method of claim 6 further including:
   generating an interpolated noise reduced base digital image by spatially filtering the noise reduced base digital image with the interpolation filter; and
   generating the reconstructed digital image by combining the residual digital image and the interpolated noise reduced base digital image.

9. The method of claim 8 wherein combining the residual digital image with the interpolated noise reduced base digital image includes calculating the addition of the residual digital image and the interpolated noise reduced base digital image.

10. The method of claim 1 wherein the noise reduction filter used to remove noise from the base digital image includes:
    identifying a pixel of interest and a local neighborhood of pixels located about the pixel of interest;
    calculating a difference pixel value for pixels in the local neighborhood of pixels based on the absolute difference between the value of the pixel of interest and the individual values of pixels included in the local neighborhood of pixels;
    using the absolute difference pixel values to calculate a noise reduced pixel value; and
    replacing the value of the pixel of interest with the noise reduced pixel value.

11. The method of claim 10 further including:
    comparing the absolute difference pixel values to a threshold value; and
    using only the values of pixels included in the local neighborhood of pixels for which the corresponding absolute difference pixel values are less than the threshold value to calculate the noise reduced pixel value.

12. The method of claim 11 wherein the threshold value is a function of the values of pixels included in the local neighborhood of pixels.

13. The method of claim 1 wherein the noise reduction filter is adaptive and changes in response to the signal content of the pixels values of the digital image.

14. The method of claim 1 wherein the noise reduction filter is a median filter.

15. The method of claim 6 wherein the interpolation filter is a bilinear interpolation filter.

16. The method of claim 6 wherein the interpolation filter is a bicubic interpolation filter.

17. The method of claim 1 wherein the original digital image includes a luminance component and two chrominance components.

18. The method of claim 17 wherein the noise filter is used to remove more noise from the chrominance components than the luminance component.

19. In a method of removing noise from a digital image comprising:
   a) receiving an original digital image including a plurality of pixels;
   b) noise filtering the original digital image to produce a noise reduced original digital image;
   c) sequentially generating, starting from the noise reduced original digital image, a plurality of residual digital images and a plurality of corresponding base digital images, respectively, wherein each base digital image has a lower spatial resolution than the previous digital image from which is was derived; and
   d) generating noise reduced base digital images by removing noise from at least one base digital image with a noise reduction filter so that when the noise reduced base digital images are combined with corresponding residual digital images to produce reconstructed digital images, noise is reduced in the reconstructed digital images as compared to the original digital image.

20. The method of claim 19 wherein a first noise reduction filter is used to remove noise from one of the base digital images and a second noise reduction filter is used to remove noise from a different base digital image.

21. A computer storage medium having instructions stored therein causing a computer to perform the method of claim 1.

22. A method of removing noise from a digital image, comprising:
   a) receiving an original digital image including a plurality of pixels;
   b) considering the original digital image as a starting digital image;
   c) using the starting digital image to generate a base digital image having a lower spatial resolution than the starting digital image;
   d) using the base digital image to generate a corresponding residual digital image;
   e) removing noise from the base digital image to generate a noise reduced base digital image;
   f) generating a multiresolution representation digital image including a set of at least one residual digital image and a set of at least one noise reduced based digital images by repeating procedural operations c) through e) one or more times wherein each repeated procedure considers the noise reduced base digital image from the previous procedure to be the starting digital image for the next procedure; and
   h) using the multiresolution representation digital image to generate a reconstructed digital image having the same or lower spatial resolution than the original digital image.

23. The method of claim 22 wherein the original digital image is noise filtered to remove noise prior to b).

24. A method of removing noise from a digital image, comprising:
   a) receiving an original digital image including a plurality of pixels;
   b) generating a multiresolution representation digital image from the original digital image including:
      i) a plurality of residual digital images having progressively lower spatial resolution; and
      ii) a base digital image having a spatial resolution equal to or lower than the lowest spatial resolution residual digital image; and
   c) filtering the base digital image to remove noise; and
   d) generating a noise reduced original digital image from the multiresolution representation digital image.

25. A method of removing noise from a digital image, comprising:
   a) receiving an original digital image including a plurality of pixels;
   b) generating a multiresolution representation digital image from the original digital image, wherein the multiresolution representation digital image can be used to reconstruct a digital image equivalent to the original digital image, including:
      i) a set of one or more residual digital images having progressively lower spatial resolution; and
      ii) a base digital image having a spatial resolution equal to or lower than the lowest spatial resolution residual digital image; and
   c) generating a noise reduced original digital image from the multiresolution representation digital image without noise filtering the plurality of residual digital images.

26. A method of removing noise from a digital image, comprising:
   a) receiving an original digital image including a plurality of pixels;
   b) generating a multiresolution representation digital image from the original digital image including:
      i) a set of one or more of residual digital images having progressively lower spatial resolution; and
      ii) a base digital image having a spatial resolution equal to or lower than the lowest spatial resolution residual digital image; and
   c) generating a noise reduced reconstructed digital image from the multiresolution representation digital image by:
      i) considering the base digital image as a starting digital image;
      ii) removing noise from the starting digital image to generate a noise reduced base digital image;
      iii) generating a reconstructed base digital image by combining the noise reduced base digital image with the residual digital image having the corresponding spatial resolution;
      iv) considering the reconstructed base digital image as a starting digital image; and
      v) repeating operation c)ii) through c)iv) until the reconstructed base digital image is of the same or lower spatial resolution as the original digital image.

27. A method of removing noise from a digital image, comprising:
   a) receiving an original digital image including a plurality of pixels;
   b) generating a multiresolution representation digital image from the original digital image having a set of progressively lower spatial resolution grouplet wherein each grouplet includes a base digital image and one or more corresponding residual digital images; and c) generating a reconstructed noise reduced original digital image from the multiresolution digital image, starting with the lowest spatial resolution grouplet, by iteratively:
  i) generating a noise reduced base digital image by removing noise from the base digital image with a noise filter; and
  ii) generating a reconstructed base digital image, of higher spatial resolution than the base digital image by combining the noise reduced base digital image with the residual digital images from the next higher spatial resolution grouplet, and
  iii) considering the reconstructed base digital image as the base digital image for the next iteration.

28. A method of reducing noise in an original digital image having a plurality of pixels, comprising:
a) decomposing the original digital image into a multiresolution respresentation digital image including a set of residual digital images at multiple spatial resolutions and a base digital image, wherein a reconstructed image equivalent to the original digital image can be generated from the multiresolution representation digital image;
b) removing noise from the base digital image by applying a noise filter; and
c) using the multiresolution representation to generate a reconstructed digital image that has less noise than the original digital image.

29. A method of reducing noise in an original digital image having a plurality of pixels, comprising:
a) decomposing the original digital image into a multiresolution representation digital image including a set of residual digital images at multiple spatial resolutions and a base digital image, wherein a reconstructed image equivalent to the original digital image can be generated from the multiresolution representation digital image; and
b) using the multiresolution representation to generate a reconstructed digital image that has less noise than the original digital image by iteratively:
  i) removing noise from the base digital image to generate a noise reduced base digital image;
  ii) using the corresponding spatial resolution residual digital image and the noise reduced base digital image to generate a base digital image of higher spatial resolution than the noise reduced base digital image.

30. A method of reducing noise in an original digital image having a plurality of pixels, comprising:
a) decomposing the original digital image into a multiresolution representation digital image including a set of residual digital images at multiple spatial resolutions and a base digital image, wherein a reconstructed image equivalent to the original digital image can be generated from the multiresolution representation image by, starting with the original digital image, iteratively:
  i) removing noise from the starting digital image to generate a noise reduced base digital image;
  ii) filtering the noise reduced base digital image to generate a smaller base digital image having a lower spatial resolution than the noise reduced base digital image;
  iii) using the noise reduced base digital image to generate a corresponding residual digital image; and
  iv) considering the smaller base digital image as the starting digital image for the next iteration; and
b) using the multiresolution representation to generate a reconstructed digital image that has less noise than the original digital image.

31. A method of constructing a multiresolution representation for a digital image, comprising:
a) receiving an original digital image including a plurality of pixels;
b) generating a multiresolution representation digital image from the original digital image having:
  i) a set of one or more of noise reduced base digital images having progressively lower spatial resolution, wherein each noise reduced base digital image is generated by filtering a digital image having a higher spatial resolution and applying a noise filter to that base digital image to remove noise; and
  ii) a set of one or more residual digital images having progressively lower spatial resolution, wherein at least one of the residual digital images is generated from a noise reduced base digital image.

32. A method of constructing a multiresolution representation for a digital image, comprising:
a) receiving an original digital image including a plurality of pixels; and
b) generating a multiresolution representation digital image from the original digital image having a set of one or more noise reduced base digital images having progressively lower spatial resolution, and a set of one or more residual digital images having progressively lower spatial resolution, by iteratively;
  i. generating a base digital image from the original digital image;
  ii. removing noise from the base digital image using a noise filter to generate a noise reduced base digital image;
  iii. generating a residual digital image from the noise reduced base digital image; and
  iv. considering the noise reduced base digital image from the previous iteration as a starting digital image for a next iteration.

* * * * *